Aug. 18, 1959 T. BARABUTES ET AL 2,900,627
REMOTE METERING APPARATUS
Filed June 21, 1955
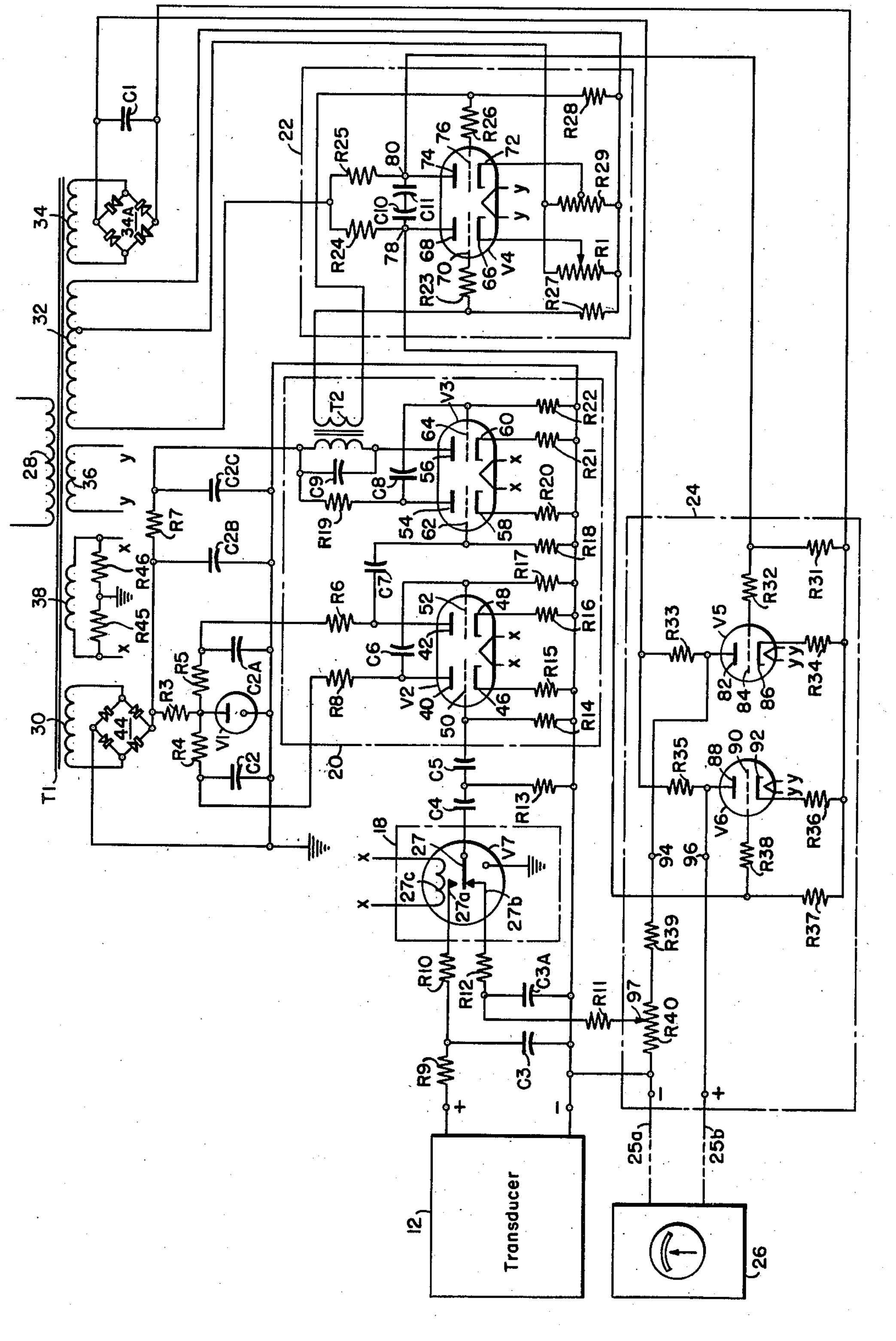

United States Patent Office 2,900,627
Patented Aug. 18, 1959

2,900,627

REMOTE METERING APPARATUS

Theodore Barabutes, Highland Park, and Andrew Kulick, Jr., Bloomfield, N.J., assignors to Westinghouse Electric Corporation, East Pittsburgh, Pa., a corporation of Pennsylvania Application June 21, 1955, Serial No. 516,972

7 Claims. (Cl. 340—186)

This invention relates to apparatus for producing a direct current controlled by a direct voltage and it has particular relation to current balance telemetering apparatus.

In accordance with the invention, a variable direct voltage is represented by a current which can be transmitted to a distant receiver. To this end the direct voltage is converted into an alternating voltage which is amplified and demodulated preferably by means of a phase sensitive demodulator. The output of the demodulator is applied to an amplifier which preferably is of a differential type. The differential amplifier supplies an output direct current which is proportional to the aforesaid direct voltage and which may be transmitted over pilot wires to a distant receiver. A feedback voltage which is proportional to the output current is converted into an alternating voltage which is employed for maintaining the desired relationship between the output current and the initial direct voltage. The desired relationship between output current and the initial direct voltage is maintained over a substantial range of variation of the resistance of the output circuit. This enables the apparatus to be employed with different pilot wire channels which differ appreciably in resistance.

In a preferred embodiment of the invention a transmitter operates as a closed-loop system wherein a function of a transmitter output quantity is fed back for comparison with a function of an input quantity. The difference between the two functions represents an error signal which controls a high-gain amplifier to vary the output quantity until the error signal is reduced to a very small value. To produce the error signal the output quantity and the input quantity are represented by two phase-opposed alternating quantities having magnitudes dependent respectively on the output and input quantities. The difference between the alternating quantities represents an alternating error signal which can be readily amplified.

It is therefore an object of the invention to provide an improved current balance telemetering transmitter.

It is a further object of the invention to provide apparatus wherein a direct voltage controls an output current and wherein direct quantities representative of the direct voltage and the output current are independently converted into alternating quantities, the apparatus also including a demodulator responsive to the difference between the alternating quantities.

It is also an object of the invention to provide telemetering apparatus employing a phase sensitive demodulator wherein the output of the phase sensitive demodulator is applied to a differential amplifier.

It is an additional object of the invention to provide an electronic transmitter for use with pilot wire channels wherein the performance of the transmitter is substantially independent of the resistance of the pilot wire channels associated therewith.

Other objects of the invention will be apparent from the following description taken in conjunction with the accompanying drawing in which the single figure is a schematic view of a telemetering system.

Referring to the single figure of the drawing a telemetering system is illustrated wherein components are grouped into units for the purpose of facilitating the presentation of the invention. The relationship between the units will be generally set forth and thereafter each of the units will be discussed separately.

The telemetering system includes a transducer 12 which generates a direct voltage representative of a quantity which is to be transmitted or indicated at a distant receiving point. The direct voltage is applied to a modulator 18 which converts the direct voltage into an alternating quantity. This greatly facilitates the amplification of the quantity to be transmitted.

The output of the modulator is amplified by an amplifier 20 which may be of conventional construction and the output of the amplifier in turn is demodulated by a demodulator 22. Although the demodulator may be of a conventional type, it is preferred that a phase sensitive demodulator be employed.

The demodulator output is amplified in an output amplifier 24 which may be of conventional construction. Preferably the output amplifier is of a differential type for reasons to be pointed out below.

Output current from the output amplifier is supplied over a pilot wire channel represented by conductors **25*a* and 25*b* to a receiver 26 which is located at a point remote from the transmitter. The output current also flows through a feedback resistor R40 for the purpose of developing a feedback voltage across the resistor to be compared with the direct voltage produced by the transducer 12**.

The transducer 12, the modulator 18, the amplifier 20 and the demodulator 22 may be similar to the units bearing the same reference characters in the Oman et al. Patent 2,640,974. However, certain of the units advantageously may be of different construction and the preferred construction of each of the units now will be set forth.

As previously pointed out, the transducer 12 is employed for producing a direct voltage representative of the quantity to be transmitted to a distant or remote point. The transducer may be of any conventional type such as a thermocouple. However, for present purposes, it will be assumed that the transducer is a thermal converter or thermocouple wattmeter similar to that referred to in the aforesaid Oman et al. patent.

Although the output of the transducer may be applied directly to the modulator 18, preferably a filter represented by resistors R9 and R10 and a capacitor C3 is interposed between the two units. This filter transmits direct current but tends to prevent the application of alternating current from the modulator 18 to the transducer 12.

In a preferred embodiment of the invention, the modulator 18 is of the synchronous chopper type. In such a modulator a reed or movable contact 27 is vibrated between two fixed contacts **27*a* and 27*b* by means of a winding 27*c* which is energized from a source of alternating current. The movable contact 27** vibrates in synchronism with the applied alternating current. Synchronous choppers of this type are well known in the art.

Power for the various units is obtained from a transformer T1 having a primary winding 28 which is connected to a suitable source of alternating current. Such a source may be the conventional power source having a voltage of 120 volts and a frequency of 60 cycles per second. The transformer T1 has five secondary windings 30, 32, 34, 36 and 38. The winding **27*c* of the modulator 18 is connected across a secondary winding 38**. As shown, a resistor having a grounded center tap also is connected across this secondary winding. The windings 36 and 38 supply current to tube heaters through conductors marked $y$ and $x$ respectively.

The movable contact 27 of the synchronous chopper serves to connect the output terminals of the transducer 12 across an input resistor R14 of the amplifier 20 periodically. Preferably a filter represented by capacitors C4 and C5 and a resistor R13 is interposed between the modulator 18 and the amplifier 20. This filter blocks the flow of direct current to the amplifier but permits the flow of alternating current at the chopper synchronizing frequency.

As previously pointed out, the amplifier 20 may be of any conventional construction. In the embodiment illustrated herein the amplifier includes two dual triode tubes V2 and V3 which may be of the well-known vacuum type bearing the designation 12AU7. The tube V2 has anodes or plates 40 and 42 which are connected to the positive terminal of a source of direct current through plate resistors R8 and R6, respectively. The direct voltage may be derived from the secondary winding 30 through a full-wave rectifier 44. A voltage regulator tube V1 of conventional type is connected across the output terminals of the rectifier through a resistor R3. The negative terminal of the rectifier 44 is shown to be grounded.

The tube V2 includes cathodes 46 and 48 which are connected respectively to ground through resistors R15 and R16. It will be noted that the plate 40 and the cathode 46 with its resistor R15 are connected across the voltage regulator tube V1 through a filter which includes the resistor R8, a resistor R4 and a capacitor C2. The filter assists in eliminating ripples from the direct current supplied to the tube V2. In an analogous manner, the plate 42 and the cathode 48 with its resistor R16 are connected across the voltage regulator tube V1 through a filter which includes the resistor R6, a resistor R5 and a capacitor C2A. Grids 50 and 52 also are provided for the tube V2.

In an analogous manner, the tube V3 includes plates 54 and 56, cathodes 58 and 60 and grids 62 and 64. The cathodes 58 and 60 are connected to ground through the resistors R20 and R21. The output of the rectifier 44 is applied across the plate 54 and the cathode 58 through a plate resistor R19 and the cathode resistor R20. Preferably a filter represented by a resistor R7 and the capacitors C2B and C2C is interposed between the rectifier and the tube for removing ripples from the output of the rectifier. It will be noted that the plate 56 is connected to the positive terminal of the rectifier 44 through the primary winding of an output transformer T2. The capacitor C9 may be employed to bypass high frequency alternating current around the primary winding while not bypassing substantially frequencies of the order of 60 cycles per second.

The voltage across the input resistor R14 is applied between the grid 50 and the cathode 46 through the resistor R15. The output of this section of the tube is coupled through a coupling capacitor C6 across a resistor R17. By inspection of the figure, it will be noted that the resistor R17 is connected between the grid 52 and the cathode 48 through the resistor R16. Consequently, this section of the tube acts as the second stage of the amplifier. The output of the second stage is coupled through a coupling capacitor C7 across a resistor R18. This resistor is connected between the grid 62 and the cathode 58 through the resistor R20. Consequently, the first section of the tube V3 acts as the third stage of the amplifier. The output of this stage is coupled through a capacitor C8 across the resistor R22 which serves as the input resistor for the fourth stage of the amplifier.

As previously pointed out, the demodulator preferably is of the phase sensitive type. To this end, the demodulator employs a tube V4 which is illustrated as a dual triode tube and which may be of the type commonly designated as a 12AU7 tube. The first section of the tube V4 includes a cathode 66, a plate 68 and a grid 70. The second section includes a cathode 72, a plate 74 and a grid 76. The two plates 68 and 74 are connected through resistors R24 and R25 respectively to one terminal of the secondary winding 32. Two capacitors C10 and C11 are connected in series between the two plates 68 and 74. For polarized capacitors the two negative terminals of the capacitors are connected together and the remaining terminals are connected respectively to the plates 68 and 74.

A section of the secondary winding 32 is connected across voltage dividing resistors R1 and R29. An adjustable tap on the resistor R1 is connected to the cathode 66 whereas the center tap on the resistor R29 is connected to the cathode 72. Adjustment of the tap on the resistor R1 permits the two sections of the tube to be adjusted for zero output of the demodulator when no input is applied to the demodulator.

The grid 70 is connected to one terminal of the secondary winding of the output transformer T2 through a resistor R23 whereas the grid 76 is connected to the remaining terminal of the secondary winding through the resistor R26. In addition two resistors R27 and R28 are connected in series across the secondary winding.

By inspection of the figure, it will be noted that the voltage across the resistor R27 is applied between the grid 70 and cathode 66 through the resistor R23 and a portion of the resistor R1. In a similar manner, the voltage across the resistor R28 is connected across the grid 76 and the cathode 72 through the resistor R26 and a portion of the resistor R29.

The voltage appearing across the secondary winding of the transformer T2 is in phase with or in phase opposition with respect to the alternating voltage applied between the plates and cathodes of the tube V4 depending on the polarity of the output of the transducer 12. The voltage applied between the grid 70 and the cathode 66 is opposite in phase to the voltage applied between the grid 76 and cathode 72. Consequently, for one polarity of the output of the transducer 12 substantial current will flow through the plate resistor R24 whereas negligible current will flow through resistor R25 and the output terminal 80 will be positive with respect to the output terminal 78. For the opposite polarity of the output of the transducer 12 substantial current will flow through the plate resistor R25 and the terminal 78 will be positive relative to the terminal 80. Consequently, the output of the demodulator has a polarity dependent on the output of the transducer 12.

The output amplifier 24 includes two triodes V5 and V6. The triode V5 has a plate 82, a grid 84 and a cathode 86. The triode V6 has a plate 88, a grid 90 and a cathode 92. The plates 82 and 88 are connected respectively through resistors R33 and R35 to the positive terminal of a full-wave rectifier 34A energized from the secondary winding 34. A filter capacitor C1 is connected across the output terminals of the rectifier. The negative terminal of the rectifier is connected respectively through resistors R34 and R36 to the cathodes 86 and 92.

It will be noted that the resistors R31 and R37 are connected in series across the output terminals 78 and 80 of the demodulator. The voltage appearing across the resistor R31 is applied across the grid 84 and the cathode 86 through the resistor R34 and a resistor R32. The voltage across the resistor R37 is applied across the grid 90 and the cathode 92 through the resistor R37 and a resistor R38.

If the output terminal 78 of the demodulator is positive relative to the terminal 80, it follows that the grid 90 of the tube V6 will be positive with respect to the cathode 92 whereas the grid 84 will be negative relative to the cathode 86. Consequently, current flows through the resistor R35 whereas negligible current flows through the resistor R33 and the output terminal 94 of the output amplifier is positive relative to the output terminal 96. By analogous reasoning, a reversal in the output polarity of the demodulator is accompanied by a reversal in polarity of the voltage appearing across the terminals 94 and 96.

The terminals 94 and 96 are connected across the receiver 26 through a resistor R39, a feedback resistor R40 and the pilot wires 25*a* and 25*b*. One terminal of the resistor R40 is grounded. An adjustable tap 97 is associated with the resistor for providing an adjustable feedback voltage which is adjustable relative to the current supplied to the receiver 26. It will be noted that the fixed contact 27*b* of the modulator is connected to the adjustable tap 97 of the feedback resistor R40. Consequently, the feedback voltage is chopped as a result of vibration of the movable contact 27 relative to the contact 27*b* and an alternating voltage proportional to the feedback voltage is applied across the resistor R14. Preferably, a filter represented by the resistors R11 and R12 and capacitor C3A is connected between the feedback voltage derived from the resistor R40 and the demodulator for the purpose of preventing transmission of alternating quantities from the modulator to the resistor R40.

Because of the operation of the movable contact 27, two alternating voltages are applied across the resistor R14 which are displaced in phase by 180°. One of these voltages is derived from the transducer 12 whereas the other voltage is derived from the feedback resistor R40. The voltages are so poled that the difference between the two voltages is applied to the input of the amplifier 20. If the polarity of the transducer reverses, the polarity of the feedback voltage also reverses and the difference between these two voltages still is applied to the amplifier.

In operation the tap on the feedback resistor R40 may be adjusted until for the full rated output of the transducer a predetermined direct current is supplied to the receiver 26. Thus, a current of 5 milliamperes may be employed to indicate a full scale value of the quantity to be measured. If the amplifier has a high gain, the feedback is maintained substantially equal to the output voltage of the transducer at all times and the receiver 26 accurately measures the desired quantity.

It will be noted that the feedback resistor is not associated with the input circuits of the tube V5 and V6 but is differentially associated with the output circuits of these tubes. As a result, it has been found that the transmitter is substantially independent of the resistance of the pilot wires or of the output circuit over a substantial range of resistance such as a range of zero to 10,000 ohms. This is particularly desirable in telemetering applications for the reason that pilot wire circuits differ in resistance within this range. Despite this difference in resistance, a standard transmitter embodying the invention may be employed for each of the pilot wire circuits.

The transmitter in effect compares the voltage output of the transducer 12 with the voltage drop across the effective portion of the resistor R40. This voltage drop is dependent solely on the current supplied over the pilot wires. If the resistance of the pilot wires is increased while the transmitter is in operation, the current through the resistor R40 and the voltage drop across the effective part of the resistor would tend to drop. However, a difference voltage would appear promptly across the resistor R14 which would be amplified and demodulated to increase the output of the amplifier. The amplifier promptly restores the current through the pilot wires to the correct value which produces a voltage drop across the effective part of the resistor R40 which substantially balances the voltage output of the transducer 12.

The receiver 26 may be of any type responsive to direct current. If the polarity of the transducer output is subject to change, the receiver 26 preferably is responsive to polarity as well as magnitude. Thus the receiver 26 may be a center-zero, permanent-magnet, moving-coil instrument of conventional design.

The operation of the system may be reviewed briefly as follows: The output amplifier 24 supplies to the receiver 26 a direct current output quantity which is dependent on the direct voltage input received by the modulator or synchronous inverter 18 from the transducer 12.

A first alternating input quantity appears across the resistor R14 and is differentially derived in the output circuit of the modulator 18 from a second alternating quantity produced from the direct voltage input received from the transducer 12 by first means which includes the contact 27*a* cooperating with the contact 27, and a third alternating quantity produced from the direct current output quantity by second means which includes the contact 27*b* cooperating with the contact 27.

The first alternating input quantity appearing across the resistor R14 is amplified in a conventional manner by the amplifier 20 and the amplifier output is applied in phase opposition in the phase comparison device which comprises the demodulator 22 to the grids 70 and 76 of the tube V4. Since the discharge or plate circuits of the tube are energized in parallel from the source (transformer T1) which also energized the winding of the modulator 18, it follows that the output derived from the terminals 78 and 80 has a polarity dependent on the polarity of the output of the transducer 12.

The output amplifier has one tube V5 which is conductive for one polarity across the terminals 78 and 80 and a second tube V6 which is conductive for the other polarity. Since a direct voltage is applied to the discharge or plate circuits and since the plate circuits are differentially associated relative to the terminals 94 and 96, the polarity of the voltage across the terminals follows the polarity of the transducer output.

From the foregoing it follows that any difference between the voltage output of the transducer 12 and the voltage appearing across the effective part of the resistor R40 is amplified. Consequently, the current flowing through the receiver 26 and therefore through the resistor R40 is held proportional to the output of the transducer 12.

Although the invention has been described with reference to certain specific embodiments, numerous modifications falling within the spirit and scope of the invention are possible.

We claim as our invention:

1. In a device for producing a direct current output controlled by a direct voltage input, a translating device for converting a first alternating input quantity into a direct current output quantity having a value dependent on the magnitude of the first alternating input quantity, first means for converting a direct voltage quantity into a second alternating quantity having a magnitude dependent on the direct voltage quantity, second means for producing a third alternating quantity having a magnitude dependent on the magnitude of the direct current output quantity, and means differentially combining the second and third alternating quantities to produce said first alternating input quantity, said alternating quantities having the same fundamental frequency.

2. A device as claimed in claim 1 wherein said second and third alternating quantities differ in phase by 180°.

3. A device as claimed in claim 1 wherein the first and second means comprise a synchronous switch device having a common output circuit and a pair of input circuits, said synchronous switch device comprising means for alternately coupling the input circuits to the output circuit, said direct voltage quantity being applied to one of the input circuits for applying said second alternating quantity to the output circuit and the direct current output quantity being applied to the other of the input circuits for applying said third alternating quantity to the output circuit, whereby the resultant quantity in the output circuit is said first alternating quantity.

4. In a device for producing a direct current output controlled by a direct voltage input, a translating device for converting a first alternating input quantity into a direct current output quantity having a value dependent on the magnitude of the first alternating input quantity, said direct current output quantity having a first polarity for a predetermined alternating input quantity and having a second polarity opposite to the first polarity for an alternating input quantity displaced in phase by 180° from the predetermined alternating input quantity, first means for converting a direct voltage quantity into a second alternating quantity having a magnitude dependent on the direct voltage quantity, second means for producing a third alternating quantity having a magnitude dependent on the magnitude of the direct current output quantity, and means differentially combining the second and third alternating quantities to produce said first alternating input quantity, said alternating quantities having the same fundamental frequency, said second and third alternating quantities differing in phase by 180°.

5. In a telemetering system, converting means for producing a first alternating quantity having a magnitude dependent on a direct voltage quantity for a first polarity of the direct voltage quantity, said converting means producing a second alternating quantity displaced in phase by 180° from the first alternating quantity for a second polarity of the direct voltage quantity, amplifying means responsive to the alternating output of the converting means for producing a direct output voltage having a first polarity for the first alternating quantity and a second polarity for the second alternating quantity, and a polarity-sensitive direct-current measuring device coupled for energization by the output voltage, the amplifying means including a first electronic discharge device having a control circuit and an anode output circuit for producing a substantial direct quantity output only for said first alternating quantity, a second electronic discharge device having a control circuit and an anode output circuit for producing a substantial direct quantity output only for the second alternating quantity and negative feedback means responsive differentially to the outputs of said discharge devices.

6. In a telemetering transmitter, a source of alternating current, a synchonous inverter device having first and second input circuits for coupling the device to separate energizing sources, an output circuit and means effective when energized from said alternating current source for alternately coupling the input circuits to the output circuit, a phase comparison device coupled for energization from said output circuit and said alternating current source for producing an electrical output having a phase and a magnitude controlled by the difference in magnitude between the energization received by the phase comparison device through the inverter device from the first input circuit and from the second input circuit, and means coupling the first input circuit for energization in accordance with said electrical output, whereby the electric output may be controlled in accordance with the input to the second input circuit.

7. In a telemetering transmitter, a source of alternating current, a synchronous inverter device having first and second input circuits for coupling the device to separate energizing sources, an output circuit and means effective when energized from said alternating current source for alternately coupling the input circuits to the output circuit, a phase comparison device coupled for energization from said output circuit and said alternating current source for producing an electrical output having a phase and a magnitude controlled by the difference in magnitude between the energization received by the phase comparison device through the inverter device from the first input circuit and from the second input circuit, said comparison device comprising first and second discharge circuits having an alternating voltage thereacross derived from said source, a first control circuit for the first discharge circuit permitting substantial current flow through the first control circuit only for a first phase of current in said output circuit, a second control circuit for the second discharge circuit permitting substantial current flow through the second control circuit only for a second phase of current in said output circuit, third and fourth discharge circuits, means for supplying a direct voltage for the third and fourth discharge circuits, a third control circuit permitting current to flow in the third discharge circuit only when substantial current flows through the first discharge circuit, a fourth control circuit permitting current to flow through the fourth discharge circuit only when substantial current flows through the second discharge circuit, an output circuit energized in accordance with the difference between the currents in the third and fourth discharge circuits for producing an electrical output, and means coupling the first input circuit for energization in accordance with said electrical output, whereby the electrical output may be controlled in accordance with the input to the second input circuit.

References Cited in the file of this patent

UNITED STATES PATENTS

| | | |
|---|---|---|
| 2,547,105 | Williams | Apr. 3, 1951 |
| 2,640,974 | Oman | June 2, 1953 |
| 2,648,037 | Harrison | Aug. 4, 1953 |
| 2,694,193 | Wannamaker | Nov. 9, 1954 |

FOREIGN PATENTS

| | | |
|---|---|---|
| 400,289 | Great Britain | Oct. 26, 1933 |